(12) United States Patent
Mimura et al.

(10) Patent No.: US 11,358,607 B2
(45) Date of Patent: Jun. 14, 2022

(54) VEHICLE CONTROL DEVICE

(71) Applicant: HONDA MOTOR CO., LTD., Tokyo (JP)

(72) Inventors: Yoshitaka Mimura, Wako (JP); Masahiko Shimada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 467 days.

(21) Appl. No.: 16/340,704

(22) PCT Filed: Oct. 26, 2016

(86) PCT No.: PCT/JP2016/081708
§ 371 (c)(1),
(2) Date: Apr. 10, 2019

(87) PCT Pub. No.: WO2018/078740
PCT Pub. Date: May 3, 2018

(65) Prior Publication Data
US 2019/0283777 A1    Sep. 19, 2019

(51) Int. Cl.
*B60Q 3/66* (2017.01)
*B60Q 3/283* (2017.01)
*B60Q 3/00* (2017.01)
*B62D 6/00* (2006.01)
*B62D 1/08* (2006.01)
*B60W 50/14* (2020.01)
*B60Q 3/70* (2017.01)
(Continued)

(52) U.S. Cl.
CPC ............ *B60W 50/14* (2013.01); *B60Q 3/283* (2017.02); *B60Q 3/70* (2017.02); *B62D 1/08* (2013.01); *G05D 1/0061* (2013.01); *G08B 5/36* (2013.01)

(58) Field of Classification Search
None
See application file for complete search history.

(56) References Cited

U.S. PATENT DOCUMENTS 10,071,684 B2 * 9/2018 Gascon ................ B60K 37/06
2005/0189159 A1 * 9/2005 Weber ............... B60R 21/01542
180/315
2008/0183354 A1 7/2008 Higashi et al.
(Continued)

FOREIGN PATENT DOCUMENTS

CN    102066181    5/2011
CN    103171605    6/2013
(Continued)

OTHER PUBLICATIONS

Chinese Office Action for Chinese Patent Application No. 201680089952.2 dated Nov. 25, 2020.
(Continued)

*Primary Examiner* — Adam D Tissot
*Assistant Examiner* — Laura E Linhardt
(74) *Attorney, Agent, or Firm* — Amin, Turocy & Watson, LLP

(57) ABSTRACT

A vehicle control device includes a steering wheel including an annular rim portion and a spoke portion that extends inward from the rim portion, an indicator that is disposed on the spoke portion and is able to be lit, and a controller that controls a lighting state of the indicator according to a state of driving assistance.

7 Claims, 10 Drawing Sheets

(51) Int. Cl.
    *G05D 1/00*    (2006.01)
    *G08B 5/36*    (2006.01)

(56)    References Cited

U.S. PATENT DOCUMENTS

| | | |
|---|---|---|
| 2009/0223321 A1 | 9/2009 | Stefani |
| 2014/0244115 A1* | 8/2014 | Sanma ................ B60K 35/00 |
| | | 701/42 |
| 2016/0159386 A1 | 6/2016 | Jang |

FOREIGN PATENT DOCUMENTS

| | | |
|---|---|---|
| DE | 102015016056 | 6/2016 |
| JP | 09-118238 | 5/1997 |
| JP | 11-334468 | 12/1999 |
| JP | 2001-055149 | 2/2001 |
| JP | 2010-241275 | 10/2010 |
| JP | 2010-241276 | 10/2010 |
| JP | 2010-264829 | 11/2010 |
| JP | 2014-069671 | 4/2014 |
| JP | 2014-164466 | 9/2014 |
| JP | 2015-054564 | 3/2015 |
| JP | 2016-501760 | 1/2016 |
| JP | 2016-523767 | 8/2016 |
| WO | 2014/066477 | 5/2014 |

OTHER PUBLICATIONS

International Search Report and Written Opinion for International Application No. PCT/JP2016/081708 dated Dec. 6, 2016, 10 pgs.
Japanese Office Action for Japanese Patent Application No. 2018-546985 dated Oct. 15, 2019.

* cited by examiner

VEHICLE CONTROL DEVICE

TECHNICAL FIELD

The present invention relates to a vehicle control device.

BACKGROUND ART

In recent years, research on a technology for automatically controlling at least one of acceleration/deceleration and steering of an own-vehicle such that the own-vehicle travels along a route to a destination (hereinafter referred to as automated driving) has been conducted. In this regard, when the driving mode is switched between an automated driving mode and a manual driving mode, the controller needs to notify an occupant to allow him or her to start a steering operation.

For example, Patent Document 1 below discloses a steering wheel display device that presents information regarding automated driving of a vehicle, wherein the steering wheel display device includes a light emitting element (an indicator) installed in at least a partial region of the entire circumference of a circular-shaped wheel body (rim portion) of the steering wheel mounted in the vehicle and a light emission controller that causes the light emitting element to emit light such that it can be visually recognized from the outside that the vehicle is being automatically driven and that the steering wheel is rotating. According to the steering wheel display device described in Patent Document 1, information regarding the automated driving of the vehicle can be presented such that the information can be easily seen by people inside or outside the vehicle.

CITATION LIST

Patent Literature

[Patent Document 1]
Japanese Unexamined Patent Application, First Publication No. 2014-69671

SUMMARY OF INVENTION

Technical Problem

However, in the technology described in the above Patent Document 1, when the occupant is gripping the rim portion of the steering wheel, the indicator may be covered by the hands of the occupant. Thus, for example, in the case of the configuration wherein the indicator remains lit until a scheduled end point of the automated driving is reached when a transition from the automated driving mode to the manual driving mode is performed, there is a possibility of the occupant being unable to visually recognize the lighting state of the indicator due to the occupant's gripping of the rim portion of the steering wheel. Therefore, in the related art, there is room for improvement in terms of ensuring the visibility of the indicator disposed on the steering wheel.

The present invention provides a vehicle control device which can ensure the visibility of an indicator disposed on a steering wheel.

Solution to Problem (1) A vehicle control device according to an aspect of the present invention is characterized by including a steering wheel including an annular rim portion and a spoke portion that extends inward from the rim portion, an indicator that is disposed on the spoke portion and is able to be lit, and a controller configured to control the lighting state of the indicator according to a state of driving assistance.

According to the present invention, even when the occupant is gripping the rim portion, it is possible to allow the occupant to visually recognize the indicator whose lighting state is controlled according to the state of driving assistance. Therefore, it is possible to provide a vehicle control device which can ensure the visibility of the indicator disposed on the steering wheel.

(2) In the vehicle control device according to the above aspect (1), the indicator may extend obliquely either upward or downward in a direction from a radially inner side to a radially outer side of the steering wheel with the steering wheel in a neutral state for manual driving.

With this configuration, even when the steering wheel has rotated from the neutral state for manual driving, by identifying the positional relationship between the rotational axis line of the steering wheel and both end portions of the indicator, it is possible to easily determine where each of the upper portion and the lower portion of the rim portion with the steering wheel in the neutral state is positioned with respect to the rotational axis line of the steering wheel. Thus, it is possible to easily determine the rotation angle of the steering wheel with respect to the neutral state, and thus when the occupant grips the steering wheel from a state in which the occupant is not gripping the steering wheel, it is possible to allow the occupant to smoothly grip the steering wheel.

(3) In the vehicle control device according to the above aspect (2), the indicator may include a pair of indicators, and the pair of indicators may be disposed on both sides of the steering wheel in a lateral direction of a vehicle with a rotational axis line of the steering wheel positioned therebetween with the steering wheel in the neutral state for manual driving.

With this configuration, since the pair of indicators are formed asymmetrically in the up-down direction with the steering wheel in the neutral state for manual driving, even when the steering wheel has rotated from the neutral state for manual driving, it is possible to easily determine the positions of the upper and lower portions of the steering wheel in the neutral state. Thus, it is possible to easily determine the rotation angle of the steering wheel with respect to the neutral state, and thus when the occupant grips the steering wheel from a state in which the occupant is not gripping the steering wheel, it is possible to allow the occupant to smoothly grip the steering wheel.

(4) In the vehicle control device according to any one of the above aspects (1) to (3), the indicator may be disposed on an inclined surface which is inclined either forward or rearward in a direction from a radially inner side to a radially outer side of the steering wheel on the spoke portion.

With this configuration, as compared to when the inclined surface is not inclined in the forward-rearward direction, a shadow cast by an in-vehicle structure such as the rim portion of the steering wheel is more likely to be formed on the inclined surface. Thereby, it is possible to ensure the visibility of the lighting state of the indicator disposed on the inclined surface.

(5) In the vehicle control device according to the above aspect (4), the indicator may include a pair of indicators, and the pair of indicators may be disposed on both sides of the steering wheel in the lateral direction of the vehicle with the rotational axis line of the steering wheel positioned therebetween with the steering wheel in the neutral state for manual driving.

With this configuration, inclined surfaces on which the indicators are disposed are inclined either forward or rearward in a direction toward a radially outer side of the steering wheel on the spoke portion. Therefore, the inclined surfaces are formed such that they face the opposite sides in the lateral direction of the vehicle. Thus, even when the sunlight is reflected to the occupant side on one of the inclined surfaces such that the occupant cannot visually recognize the lighting state of the corresponding indicator, the sunlight reflected on the other inclined surface is not reflected to the occupant side such that the occupant can visually recognize the lighting state of the corresponding indicator. Accordingly, it is possible to ensure the visibility of the indicators.

(6) In the vehicle control device according to any one of the above aspects (1) to (5), the steering wheel may include a switch unit having an operation member and a skin material disposed on a surface of the steering wheel with at least the operation member exposed, and the indicator may be disposed at a position along a boundary line between the skin material and the switch unit.

With this configuration, since a step is formed at the boundary between the skin material and the switch unit, the indicator can be disposed at a portion shadowed by the step. Thus, it is possible to prevent external light from being directly incident on the indicator and thus to ensure the visibility of the indicator which is being lit.

(7) In the vehicle control device according to any one of the above aspects (1) to (6), the controller may be configured to control at least one of the group consisting of a light emission color, a brightness, and a light emission area of the indicator according to the state of the driving assistance.

With this configuration, by allowing the occupant to visually recognize a change in at least one the light emission color, the brightness, or the light emission area of the indicator, it is possible to notify the occupant of the state of driving assistance.

(8) In the vehicle control device according to any one of the above aspects (1) to (7), the controller may be configured to, when notifying an occupant of transition from automated driving to manual driving, change at least one of the group consisting of a light emission color, a brightness, and a light emission area of the indicator from that before the notification.

With this configuration, by allowing the occupant to visually recognize a change in at least one the light emission color, the brightness, or the light emission area of the indicator, it is possible to notify the occupant of transition from automated driving to manual driving.

(9) In the vehicle control device according to the above aspect (8), the control unit may be configured to, if the occupant starts a steering operation when a transition from automated driving to manual driving is performed, cause the indicator to be lit until a scheduled end point of the automated driving is reached.

With this configuration, since the indicator is lit until the scheduled end point of automated driving is reached, it is possible to allow the occupant to visually recognize that a transition from automated driving to manual driving is being performed. Here, even when the occupant is gripping the rim portion, it is possible to allow the occupant to visually recognize the indicator since the indicator is arranged on the spoke portion.

(10) In the vehicle control device according to any one of the above aspects (1) to (9), the controller may be configured to, when notifying an occupant of start of automated driving, change at least one of the group consisting of a light emission color, a brightness, and a light emission area of the indicator.

With this configuration, by allowing the occupant to visually recognize a change in at least one the light emission color, the brightness, or the light emission area of the indicator, it is possible to notify the occupant of the start of automated driving.

Advantageous Effects of Invention

According to the above vehicle control device, even when the occupant is gripping the rim portion, it is possible to allow the occupant to visually recognize the indicator whose lighting state is controlled according to the state of driving assistance. Therefore, it is possible to provide a vehicle control device which can ensure the visibility of the indicator disposed on the steering wheel.

DESCRIPTION OF EMBODIMENTS

Hereinafter, embodiments of a vehicle control device of the present invention will be described with reference to the drawings.

Figure 1:
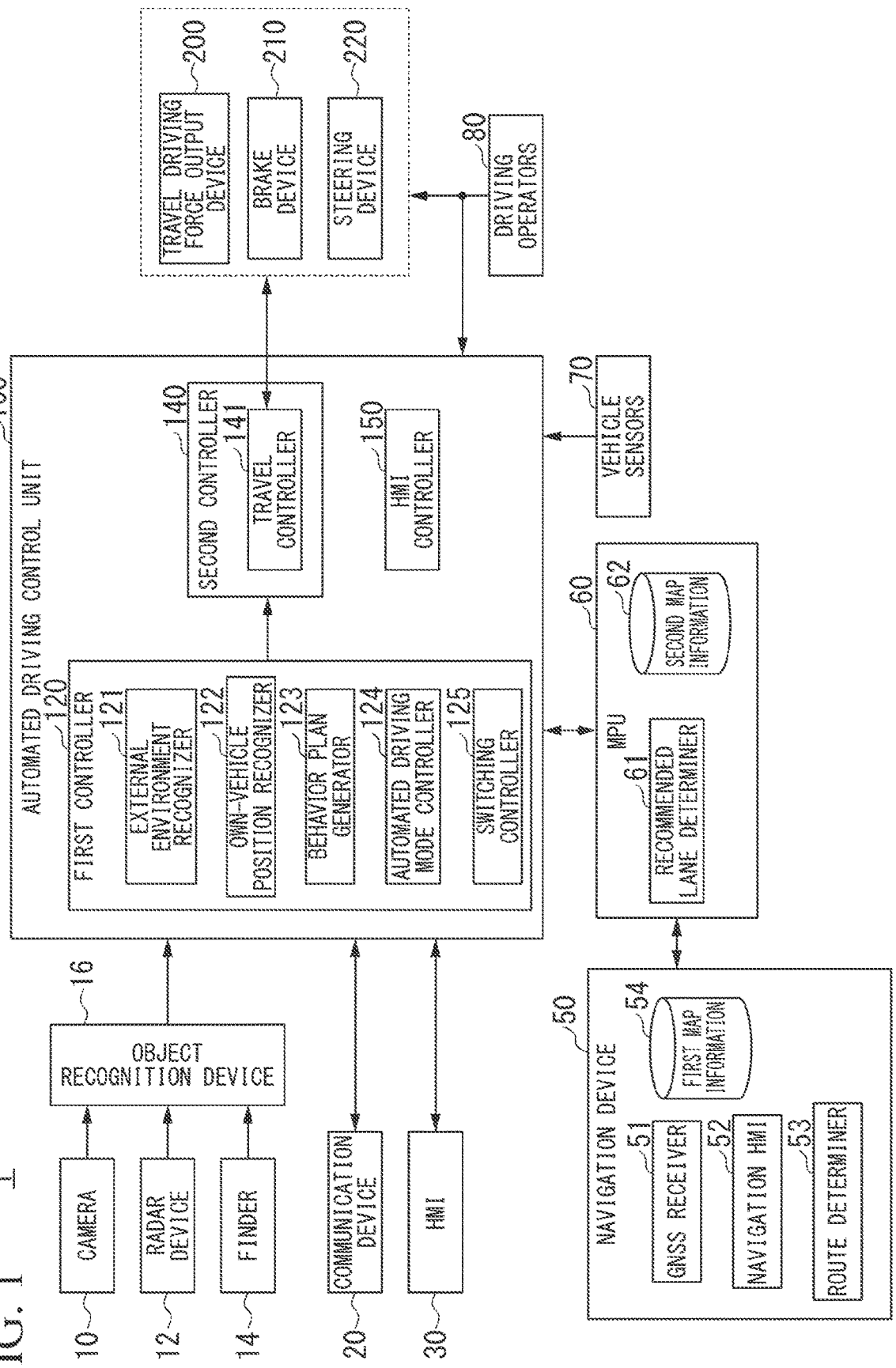
FIG. 1 is a configuration diagram of a vehicle system 1 including an automated driving control unit 100.

FIG. 1 is a configuration diagram of a vehicle system 1 including an automated driving control unit 100. A vehicle in which the vehicle system 1 is mounted is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. The electric motor operates using electric power generated by a generator connected to the internal combustion engine or using discharge power of a secondary battery or a fuel cell.

The vehicle system 1 includes, for example, a camera 10, a radar device 12, a finder 14, an object recognition device 16, a communication device 20, a human machine interface (HMI) 30, a navigation device 50, a map processing unit (MPU) 60, vehicle sensors 70, driving operators 80, an automated driving control unit 100, a travel driving force output device 200, a brake device 210, and a steering device 220. These devices or apparatuses are connected to each other by a multiplex communication line or a serial communication line such as a controller area network (CAN) communication line, a wireless communication network, or the like. The components shown in FIG. 1 are merely an example and some of the components may be omitted or other components may be added.

The camera 10 is, for example, a digital camera using a solid-state imaging device such as a charge coupled device (CCD) or complementary metal oxide semiconductor (CMOS) image sensor. One or a plurality of cameras 10 are attached to the vehicle in which the vehicle system 1 is mounted (hereinafter referred to as an own-vehicle M) at arbitrary locations. For imaging the area in front of the vehicle, a camera 10 is attached to an upper portion of a front windshield, a rear surface of a rearview mirror, or the like. For example, the camera 10 repeats imaging of the surroundings of the own-vehicle M at regular intervals. The camera 10 may also be a stereo camera.

The radar device 12 radiates radio waves such as millimeter waves around the own-vehicle M and detects radio waves reflected by an object (reflected waves) to detect at least the position (distance and orientation) of the object. One or a plurality of radar devices 12 may be attached to the own-vehicle M at arbitrary locations. The radar device 12 may detect the position and velocity of an object using a frequency modulated continuous wave (FM-CW) method.

The finder 14 is a light detection and ranging or laser imaging detection and ranging (LIDAR) finder which measures scattered light from an object in response to illuminated light to detect the distance to the object. One or a plurality of finders 14 may be attached to the own-vehicle M at arbitrary locations.

The object recognition device 16 performs a sensor fusion process on results of detection by some or all of the camera 10, the radar device 12, and the finder 14 to recognize the position, type, speed, or the like of the object. The object recognition device 16 outputs the recognition result to the automated driving control unit 100.

For example, the communication device 20 communicates with other vehicles near the own-vehicle M using a cellular network, a Wi-Fi network, Bluetooth (registered trademark), dedicated short range communication (DSRC) or the like or communicates with various server devices via wireless base stations.

The HMI 30 presents various types of information to an occupant in the own-vehicle M and receives an input operation from the occupant. The HMI 30 includes various display devices, speakers, buzzers, touch panels, switches, keys, or the like. The various display devices of the HMI 30 include an instrument panel, a head up display, or the like.

The navigation device 50 includes, for example, a global navigation satellite system (GNSS) receiver 51, a navigation HMI 52, and a route determiner 53 and holds first map information 54 in a storage device such as a hard disk drive (HDD) or a flash memory. The GNSS receiver specifies the position of the own-vehicle M on the basis of signals received from GNSS satellites. The position of the own-vehicle M may also be specified or supplemented by an inertial navigation system (INS) using the output of the vehicle sensors 70. The navigation HMI 52 includes a display device, a speaker, a touch panel, a switch, a key, or the like. The navigation HMI 52 may be partly or wholly shared with the HMI 30 described above. For example, the route determiner 53 determines a route from the position of the own-vehicle M specified by the GNSS receiver 51 (or an arbitrary input position) to a destination input by the occupant using the navigation HMI 52 by referring to the first map information 54. The first map information 54 is, for example, information representing shapes of roads by links indicating roads and nodes connected by the links. The first map information 54 may include curvatures of roads, point of interest (POI) information, or the like. The route determined by the route determiner 53 is output to the MPU 60. The navigation device 50 may also perform route guidance using the navigation HMI 52 on the basis of the route determined by the route determiner 53. The navigation device 50 may be realized, for example, by a function of a terminal device such as a smartphone or a tablet possessed by the user. The navigation device 50 may also transmit the current position and the destination to a navigation server via the communication device 20 and acquire a route returned from the navigation server.

The MPU 60 functions, for example, as a recommended lane determiner 61 and holds the second map information 62 in a storage device such as an HDD or a flash memory. The recommended lane determiner 61 divides the route provided from the navigation device 50 into a plurality of blocks (for example, into blocks each 100 meters long in the direction in which the vehicle travels) and determines a recommended lane for each block by referring to the second map information 62. The recommended lane determiner 61 determines the number of the lane from the left in which to travel. When there is a branch point, a merge point, or the like on the route, the recommended lane determiner 61 determines a recommended lane such that the own-vehicle M can travel on a reasonable route for proceeding to the branch destination.

The second map information 62 is map information with higher accuracy than the first map information 54. The second map information 62 includes, for example, information of the centers of lanes or information of the boundaries of lanes. The second map information 62 may also include road information, traffic regulation information, address information (addresses/postal codes), facility information, telephone number information, or the like. The road information includes information indicating the types of roads such as expressways, toll roads, national roads, or prefectural roads or information such as the number of lanes of each road, the widths of lanes, the gradients of roads, the positions of roads (three-dimensional coordinates including longitude, latitude and height), the curvatures of curves of lanes, the positions of merge or branch points of lanes, signs installed on roads, or the like. The second map information 62 may be updated as needed by accessing another device using the communication device 20.

The vehicle sensors 70 include, for example, a vehicle speed sensor that detects the speed of the own-vehicle M, an acceleration sensor that detects the acceleration thereof, a yaw rate sensor that detects an angular speed thereof about the vertical axis, an orientation sensor that detects the orientation of the own-vehicle M, or the like.

The driving operators 80 include, for example, an accelerator pedal, a brake pedal, a shift lever, a steering wheel 300, and other operators. Sensors for detecting the amounts of operation, the presence or absence of operation, and the like are attached to the driving operators 80 and detection results thereof are output to either or both of the automated driving control unit 100 or the travel driving force output, brake, and steering devices 200, 210, and 220.

The automated driving control unit 100 includes, for example, a first controller 120, a second controller 140, and an HMI controller 150. Some or all of the first controller 120, the second controller 140, and the HMI controller 150 are each realized by a processor such as a central processing unit (CPU) executing a program (software). Some or all of these functional units may be realized by hardware such as a large scale integration (LSI), an application specific integrated circuit (ASIC), or a field-programmable gate array (FPGA) or may be realized by hardware and software in cooperation.

The first controller 120 includes, for example, an external environment recognizer 121, an own-vehicle position recognizer 122, a behavior plan generator 123, an automated driving mode controller 124, and a switching controller 125.

The external environment recognizer 121 recognizes states of a nearby vehicle(s) such as the position, speed and acceleration thereof on the basis of information that is input from the camera 10, the radar device 12, and the finder 14 directly or via the object recognition device 16. The position of the nearby vehicle may be represented by a representative point such as a center of gravity or a corner of the nearby vehicle or may be represented by a region expressed by a contour of the nearby vehicle. The "states" of the nearby vehicle may include an acceleration or jerk of the nearby vehicle or a "behavior state" (for example, whether or not the nearby vehicle is changing or is going to change lanes). The external environment recognizer 121 may also recognize the positions of guardrails or utility poles, parked vehicles, pedestrians, and other objects in addition to nearby vehicles.

The own-vehicle position recognizer 122 recognizes, for example, a (traveling) lane in which the own-vehicle M is traveling and the relative position and attitude of the own-vehicle M with respect to the traveling lane. The own-vehicle position recognizer 122 recognizes the traveling lane, for example, by comparing a pattern of road lane lines (for example, an arrangement of solid and broken lines) obtained from the second map information 62 with a pattern of road lane lines near the own-vehicle M recognized from an image captured by the camera 10. This recognition may be performed taking into consideration a position of the own-vehicle M acquired from the navigation device 50 or a result of processing by the INS.

Figure 2:
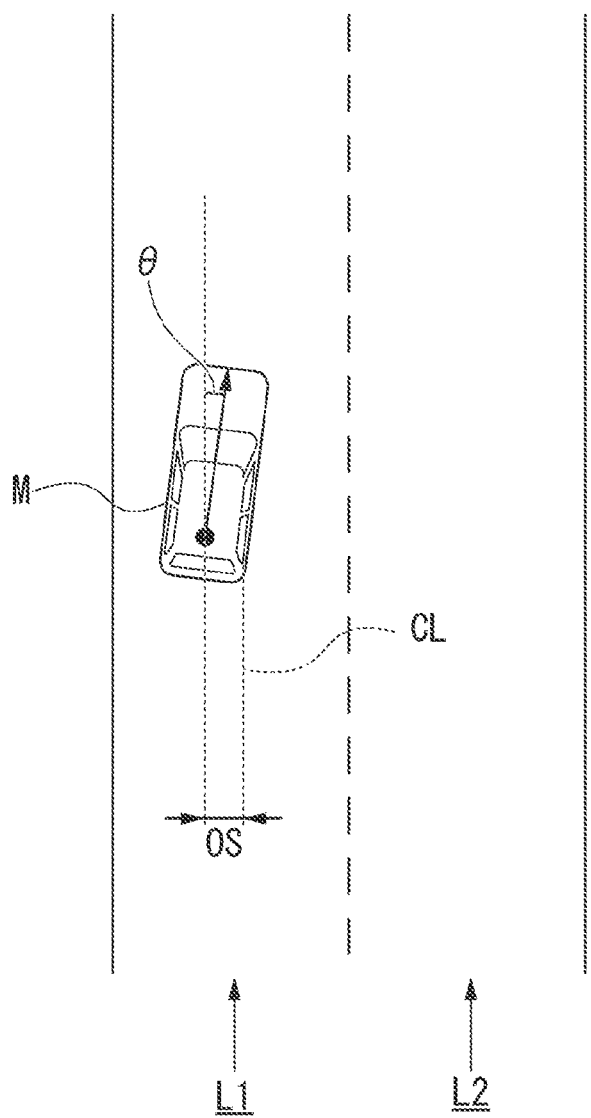
FIG. 2 is a diagram showing how the relative position and attitude of an own-vehicle M with respect to a traveling lane L1 are recognized by an own-vehicle position recognizer 122.

Then, the own-vehicle position recognizer 122 recognizes, for example, the position or attitude of the own-vehicle M with respect to the traveling lane. FIG. 2 is a diagram showing how the relative position and attitude of the own-vehicle M with respect to the traveling lane L1 are recognized by the own-vehicle position recognizer 122. For example, the own-vehicle position recognizer 122 recognizes both a deviation OS from a traveling lane center CL of a reference point (for example, the center of gravity) of the own-vehicle M and an angle θ formed by the travel direction of the own-vehicle M relative to an extension line of the traveling lane center CL as the relative position and attitude of the own-vehicle M with respect to the traveling lane L1. Alternatively, the own-vehicle position recognizer 122 may recognize the position of the reference point of the own-vehicle M with respect to one of the sides of the own lane L1 or the like as the relative position of the own-vehicle M with respect to the traveling lane. The relative position of the own-vehicle M recognized by the own-vehicle position recognizer 122 is provided to the recommended lane determiner 61 and the behavior plan generator 123.

The behavior plan generator 123 determines events which are to be sequentially performed in the automated driving such that the own-vehicle M travels in the recommended lane determined by the recommended lane determiner 61 and copes with situations occurring near the own-vehicle M. Examples of the events include a constant-speed travel event which is an event of traveling in the same traveling lane at a constant speed, a following travel event which is an event of following a preceding vehicle, a lane change event, a merging event, a branching event, an emergency stop event, and a handover event which is an event of terminating automated driving and switching to manual driving. During execution of these events, behaviors for avoidance may sometimes be planned on the basis of situations occurring near the own-vehicle M (such as the presence of nearby vehicles and pedestrians or lane narrowing due to road construction).

The behavior plan generator 123 generates a target trajectory along which the own-vehicle M will travel in the future. The target trajectory includes, for example, velocity components. For example, the target trajectory is generated as a set of target points (trajectory points) to be reached at a plurality of future reference times which are set at intervals of a predetermined sampling time (for example, about tenths of a second). Therefore, when the interval between trajectory points is great, this means that the vehicle travels at a high speed in the section between the trajectory points.

Figure 3:
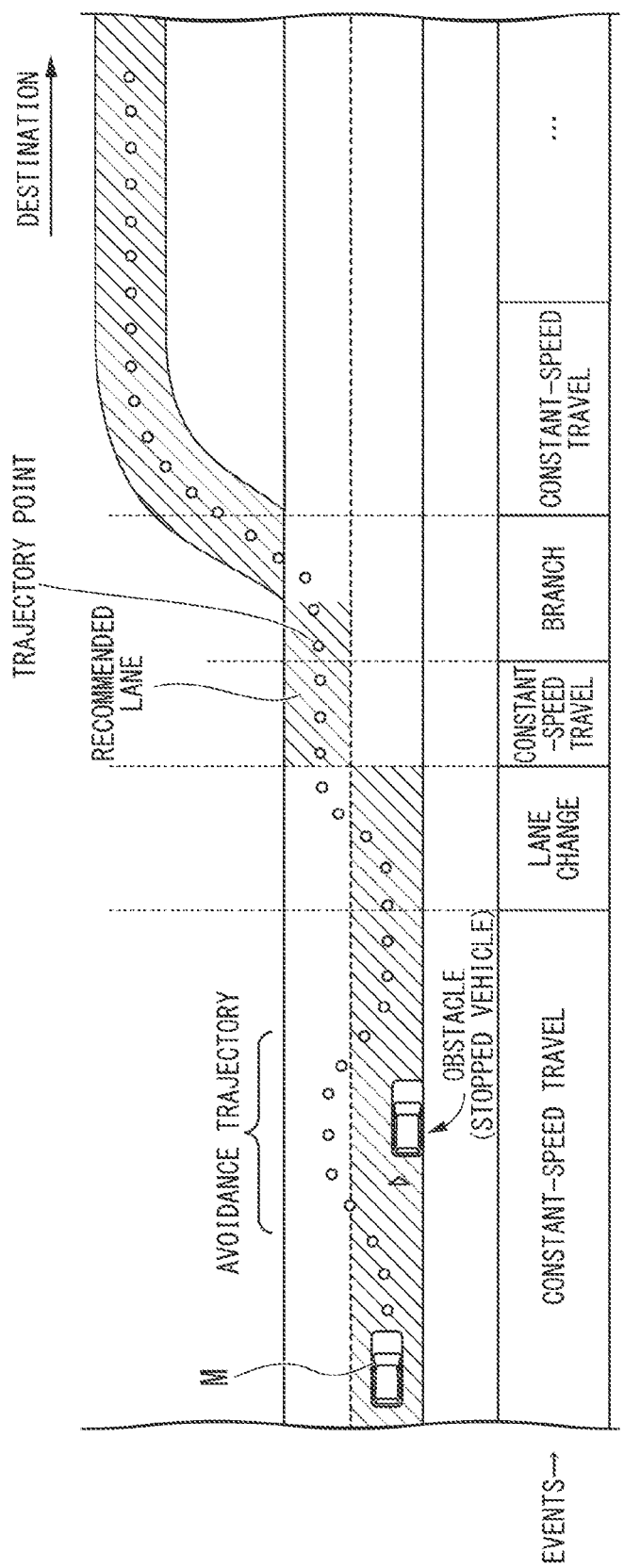
FIG. 3 is a diagram showing how a target trajectory is generated on the basis of a recommended lane.

FIG. 3 is a diagram showing how a target trajectory is generated on the basis of a recommended lane. As shown, the recommended lane is set to be convenient for traveling along the route to the destination. When the own-vehicle M approaches a predetermined distance (which may be determined according to the types of events) before a point for switching to the recommended lane, the behavior plan generator 123 activates a lane change event, a branching event, a merging event, or the like. When it becomes necessary to avoid an obstacle during execution of each event, an avoidance trajectory is generated as shown in FIG. 3.

For example, the behavior plan generator 123 generates a plurality of candidate target trajectories and selects an optimum target trajectory at a given point in time from the viewpoint of safety and efficiency.

The automated driving mode controller 124 determines an automated driving mode to be performed by the first controller 120 on the basis of an operation performed on the HMI 30 by the occupant, a travel mode determined by the event determined by the behavior plan generator 123, or the like. Automated driving modes include, for example, a mode in which all vehicle control such as complicated merging control is automatically performed, a mode in which basically all vehicle control is automatically performed, but the driving operation of the own-vehicle M is entrusted to the occupant depending on the situation, and a mode in which a confirmation operation according to a situation needs to be performed on the HMI 30.

The HMI controller 150 is notified of the determined automated driving mode. Limits according to the performance or the like of detection devices DD of the own-vehicle M may be set in the automated driving mode.

In any automated driving mode, it is possible to perform switching to manual driving (override) by operating a driving operator(s) 80. The override is initiated, for example, when the occupant of the own-vehicle M continues to perform an operation on the driving operator 80 for a predetermined time or longer, when the amount of operation change (for example, the accelerator opening degree of the accelerator pedal, the brake depression amount of the brake pedal, or the steering angle of the steering wheel 300) is equal to or more than a predetermined amount, or when an operation has been performed on the driving operator 80 a predetermined number of times or more.

The switching controller 125 performs switching between the automated driving mode and the manual driving mode on the basis of a signal input from the HMI 30. Further, the switching controller 125 performs switching from the automated driving mode to the manual driving mode on the basis of an operation which has been performed on a driving operator 80 to instruct acceleration/deceleration or steering. For example, the switching controller 125 performs switching from the automated driving mode to the manual driving mode (the override) when a state in which the amount of operation indicated by the signal input from the driving operator 80 exceeds a threshold value continues for a reference time or longer. It is to be noted that the switching controller 125 may return to the automated driving mode when no operation on the driving operator 80 is detected for a predetermined time after switching to the manual driving mode by the override. Further, for example, when handover control for transition from the automated driving mode to the manual driving mode is performed before a scheduled end point of the automated driving, the switching controller 125 outputs information on the handover to the HMI controller 150 to notify the occupant of a handover request in advance.

The HMI controller 150 controls the HMI 30 (for example, indicators 355A and 355B which will be described later) according to the state of driving assistance. The state of driving assistance is the degree of automated driving by the automated driving control unit 100. For example, a state in which the degree of automated driving is the highest is a mode in which all vehicle control is automatically performed, out of various modes of automated driving. A state in which the degree of automated driving is the lowest is a mode in which the occupant performs the steering operation, the brake operation, and the accelerator operation, that is, the manual driving mode. The HMI controller 150 controls the HMI 30 on the basis of information on the state of driving assistance obtained by the first controller 120. For example, the HMI controller 150 controls whether or not the occupant is able to operate the HMI 30, the navigation device 50, and the like on the basis of the information on the state of driving assistance. Further, the HMI controller 150 causes the HMI 30, the navigation device 50, or the like to output predetermined information at a predetermined time or a predetermined speed before handover control is performed or before the driving mode is changed to an automated driving mode in which the occupant's engagement in driving increases.

The second controller 140 includes a travel controller 141. The travel controller 141 controls the travel driving force output device 200, the brake device 210, and the steering device 220 such that the own-vehicle M passes along the target trajectory generated by the behavior plan generator 123 at scheduled times.

The travel driving force output device 200 outputs a travel driving force (torque) required for the vehicle to travel to driving wheels. The travel driving force output device 200 includes, for example, a combination of an internal combustion engine, an electric motor, a transmission, and the like and an ECU that controls them. The ECU controls the above constituent elements according to information input from the travel controller 141 or information input from the driving operators 80.

The brake device 210 includes, for example, a brake caliper, a cylinder that transmits hydraulic pressure to the brake caliper, an electric motor that generates hydraulic pressure in the cylinder, and a brake ECU. The brake ECU controls the electric motor according to information input from the travel controller 141 or information input from the driving operators 80 such that a brake torque corresponding to a braking operation is output to each wheel. The brake device 210 may include, as a backup, a mechanism for transferring a hydraulic pressure generated by an operation of the brake pedal included in the driving operators 80 to the cylinder via a master cylinder. The brake device 210 is not limited to that configured as described above and may be an electronically controlled hydraulic brake device that controls an actuator according to information input from the travel controller 141 and transmits the hydraulic pressure of the master cylinder to the cylinder.

The steering device 220 includes, for example, a steering ECU and an electric motor. The electric motor, for example, applies a force to a rack-and-pinion mechanism to change the direction of the steering wheel. The steering ECU drives the electric motor according to information input from the travel controller 141 or information input from the driving operators 80 (the steering wheel 300) to change the direction of the steering wheels.

Here, the steering wheel 300 will be described in detail. The steering wheel 300 is disposed such that its rotational axis is orthogonal to the lateral direction of the vehicle and slightly inclined with respect to the longitudinal direction of the vehicle. In the following description, the rotational axis direction of the steering wheel 300 is simply referred to as an axial direction. In the following description, it is also assumed that the occupant (driver) side of the steering wheel 300 is the front (front side) and the opposite side is the rear (rear side). It is also assumed that the side closer to the roof of the vehicle with respect to the rotational axis of the steering wheel 300 is the upper side and the opposite side (the side closer to the floor of the vehicle) is the lower side. In the following description of the configuration of the steering wheel 300, it is assumed that the steering wheel 300 is in a neutral state for manual driving (that is, a straight steering state) unless otherwise stated.

Figure 4:
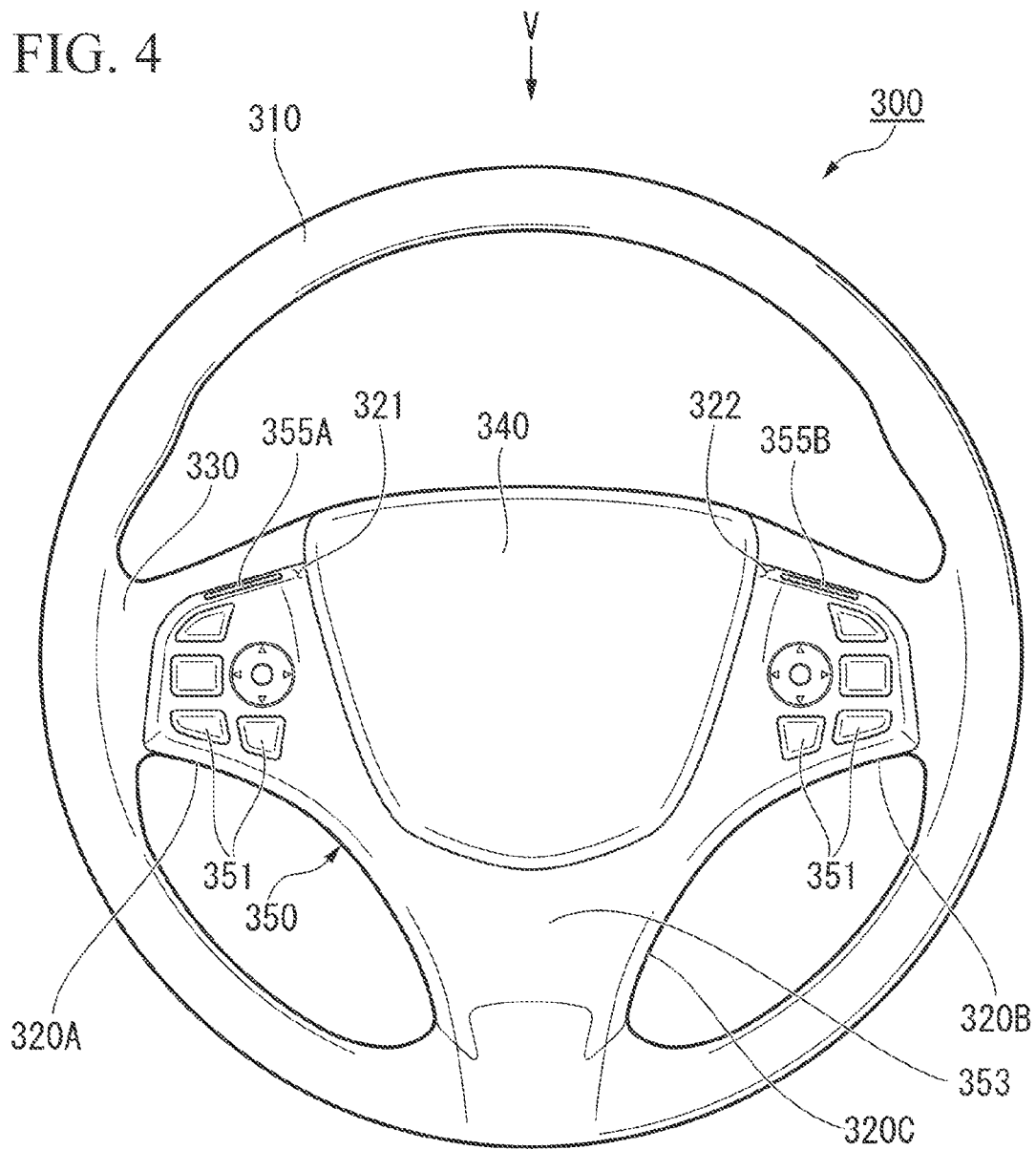
FIG. 4 is a front view of a steering wheel 300.
Figure 5:
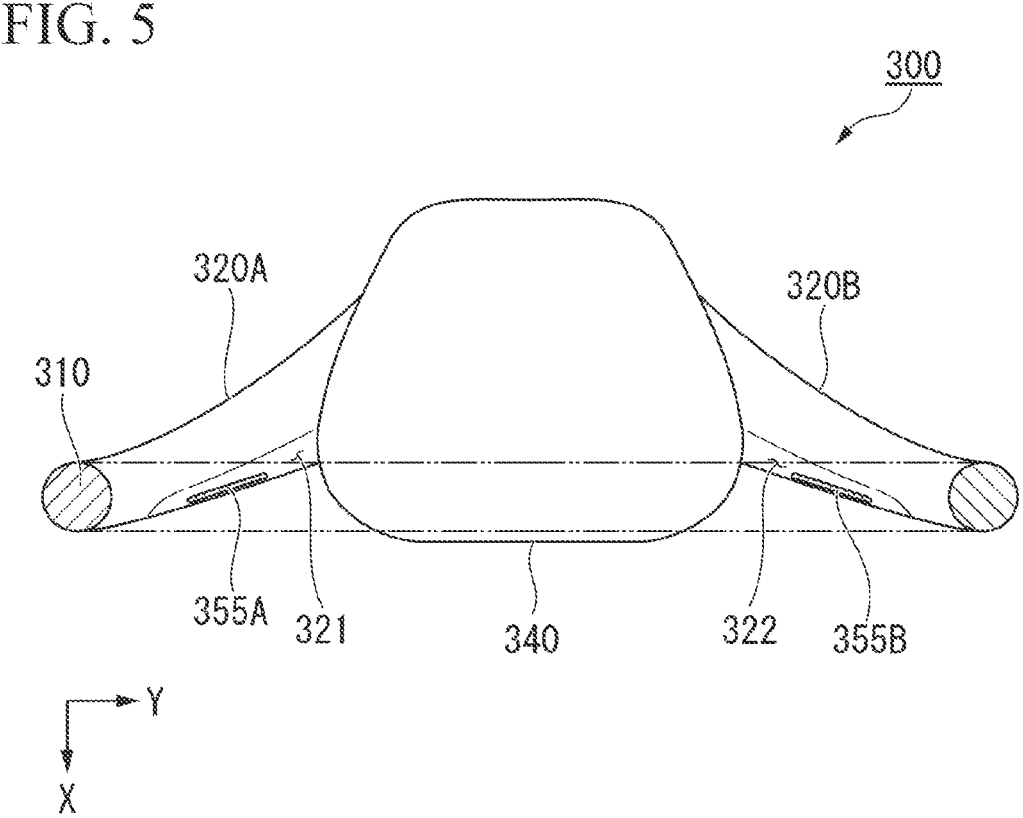
FIG. 5 is a view as seen in the direction of arrow V in FIG. 4.

FIG. 4 is a front view of the steering wheel 300. FIG. 5 is a view as seen in the direction of arrow V in FIG. 4. In the figures, the X direction coincides with the axial direction (such that the +X direction is forward), the Y direction coincides with the lateral direction of the vehicle (such that the right of the vehicle is in the +Y direction), and the Z direction coincides with a direction orthogonal to the X and Y directions (such that the +Z direction is upward).

As shown in FIG. 4, the steering wheel 300 includes an annular rim portion 310 and a plurality of spoke portions 320A to 320C (three in the present embodiment) that extend inward (toward the rotational axis side) from the rim portion 310.

The rim portion 310 is gripped by the occupant (driver) during steering. The rim portion 310 is arranged to be coaxial with the rotational axis of the steering wheel 300. The rim portion 310 is provided with a touch sensor for detecting gripping by the occupant.

The plurality of spoke portions 320A to 320C include a first spoke portion 320A, a second spoke portion 320B, and a third spoke portion 320C. The first spoke portion 320A extends rightward from a part on the left side of the rim portion 310. The second spoke portion 320B extends leftward from a part on the right side of the rim portion 310. The third spoke portion 320C extends upward from a part on the lower side of the rim portion 310. The spoke portions 320A to 320C are connected to each other at a center portion of the steering wheel 300 and are coupled to a steering shaft (not shown) on the rear side.

The first spoke portion 320A is formed such that the width in the up-down direction increases gradually in a direction from the left side to the right side as viewed from the axial direction. Specifically, an upper edge of the first spoke portion 320A as viewed from the axial direction is inclined upward in a direction from the left side to the right side. A lower edge of the first spoke portion 320A as viewed from the axial direction is inclined downward in a direction from the left side to the right side.

The second spoke portion 320B is formed such that the width in the up-down direction increases gradually in a direction from the right side to the left side as viewed from the axial direction. Specifically, an upper edge of the second spoke portion 320B as viewed from the axial direction is inclined upward in a direction from the right side to the left side. A left end portion of the upper edge of the second spoke portion 320B as viewed from the axial direction is continuous with a right end portion of the upper edge of the first spoke portion 320A as viewed from the axial direction. A lower edge of the second spoke portion 320B as viewed from the axial direction is inclined downward in a direction from the right side to the left side.

The third spoke portion 320C is formed such that the width in the left-right direction increases gradually in a direction from the lower side to the upper side as viewed from the axial direction. Specifically, a left edge of the third spoke portion 320C as viewed from the axial direction is inclined leftward in a direction from the lower side to the upper side. An upper end portion of the left edge of the third spoke portion 320C as viewed from the axial direction is continuous with a right end portion of the lower edge of the first spoke portion 320A as viewed from the axial direction. A right edge of the third spoke portion 320C as viewed from the axial direction is inclined rightward in a direction from the lower side to the upper side. An upper end portion of the right edge of the third spoke portion 320C as viewed from the axial direction is continuous with a left end portion of the lower edge of the second spoke portion 320B as viewed from the axial direction.

A skin material 330, a horn switch 340, and a switch unit 350 are provided on the surface of the steering wheel 300.

The skin material 330 is formed, for example, of natural leather or synthetic leather. The skin material 330 is disposed on the surface of the steering wheel 300 with the switch unit 350 exposed. The skin material 330 is disposed such that the surface of the skin material 330 is under the steering wheel 300 at the boundary between the skin material 330 and the switch unit 350. Therefore, a step is formed at the boundary between the skin material 330 and the switch unit 350.

The horn switch 340 is provided at a center portion of the front portion of the steering wheel 300. That is, the horn switch 340 is provided on the front portion of a part where the spoke portions 320A to 320C are connected.

The switch unit 350 has a plurality of operation members 351 which are, for example, buttons, a pedestal portion 353 which supports the operation members 351, and a plurality of indicators 355A and 355B (two in the present embodiment) which are provided on the pedestal portion 353 and can be lit.

The pedestal portion 353 is formed, for example, of a hard resin material. The pedestal portion 353 is arranged over the spoke portions 320A to 320C while avoiding the horn switch 340. The pedestal portion 353 is arranged substantially over the entire area except for a part where the horn switch 340 is disposed on the front portion of each of the spoke portions 320A to 320C.

The operation members 351 constitute a part of the HMI 30 and the navigation HMI 52 described above. The operation members 351 are provided on each of the first spoke portion 320A and the second spoke portion 320B.

The plurality of indicators 355A and 355B include a first indicator 355A and a second indicator 355B. The first indicator 355A and the second indicator 355B constitute a part of the HMI 30 described above. The first indicator 355A and the second indicator 355B are disposed at both sides of the rotational axis line of the steering wheel 300 in the lateral direction of the vehicle. The first indicator 355A and the second indicator 355B are disposed symmetrically in the left-right direction with respect to the rotational axis line of the steering wheel 300.

The first indicator 355A is disposed at a position along the boundary line between the skin material 330 and the switch unit 350 (the pedestal portion 353) on the first spoke portion 320A. The first indicator 355A linearly extends obliquely downward in a direction toward the radially outer side (the left side) along the boundary line between the skin material 330 and the switch unit 350. The first indicator 355A is disposed on a first inclined surface 321 which is inclined forward in a direction toward the radially outer side (the left side) on the first spoke portion 320A (see FIG. 5).

The second indicator 355B is disposed at a position along the boundary line between the skin material 330 and the switch unit 350 (the pedestal portion 353) on the second spoke portion 320B. The second indicator 355B linearly extends obliquely downward in a direction toward the radially outer side (the right side) along the boundary line between the skin material 330 and the switch unit 350. The second indicator 355B is disposed on a second inclined surface 322 which is inclined forward in a direction toward the radially outer side (the right side) on the second spoke portion 320B (see FIG. 5).

Each of the indicators 355A and 355B is formed, for example, of a plurality of light emitting diodes (LEDs) and a diffusion plate. The lighting state (the light emission color, the brightness, and the light emission area) of each of the indicators 355A and 355B is controlled by the HMI controller 150 described above. In the present embodiment, each of the indicators 355A and 355B is capable of emitting light in two colors, blue and amber, and is also capable of changing brightness. Each of the indicators 355A and 355B is also capable of changing the emission area. Specifically, in the present embodiment, each of the indicators 355A and 355B is capable of shifting between a state in which the emission area is large and a state in which the emission area is small as a change in the emission area. The state in which the emission area of each of the indicators 355A and 355B is large is that in which the entirety of each of the indicators 355A and 355B is lit substantially equally. The state in which the emission area of each of the indicators 355A and 355B is small is that in which only a part (for example, an end portion on the radially outer side) of each of the indicators 355A and 355B is lit. Each of the indicators 355A and 355B may also be capable of changing the lighting position in a state in which the emission area is small. A method of controlling each of the indicators 355A and 355B by the HMI controller 150 will be described later.

An air bag (not shown) is disposed inside the steering wheel 300. The air bag includes a base fabric, an inflator, and the like. The air bag is provided such that it deploys by breaking the skin material 330 of the horn switch 340.

Hereinafter, control of the lighting state of each of the indicators 355A and 355B by the automated driving control unit 100 will be described. This process flow is carried out by an occupant operating a switch to instruct the start of automated driving.

Figure 6:
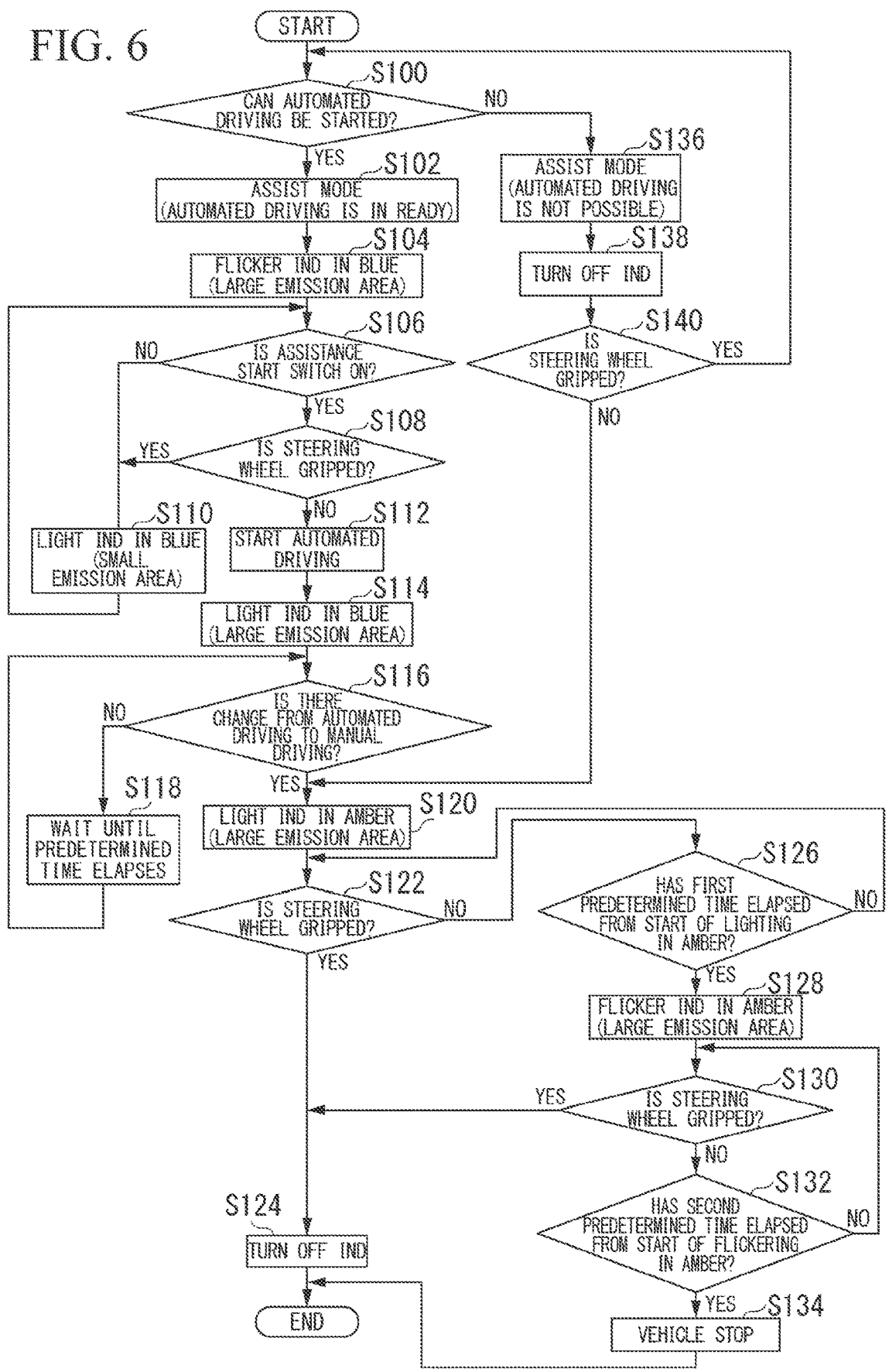
FIG. 6 is a flowchart showing a flow of processes performed by the automated driving control unit 100 according to an embodiment.
Figure 7:
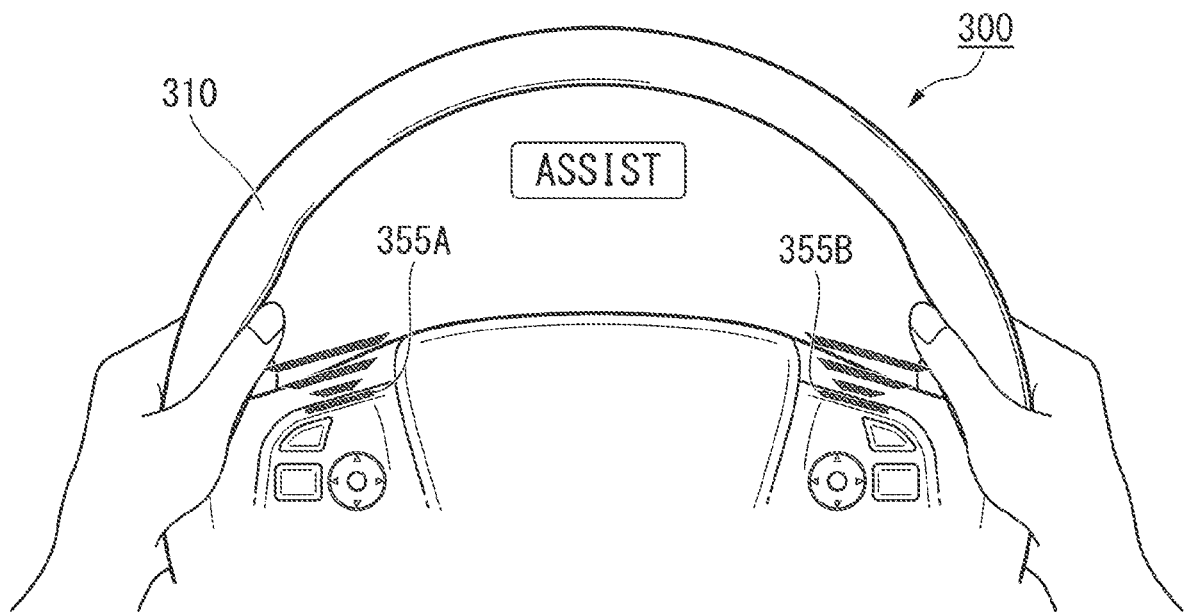
FIG. 7 is a view showing the lighting states of indicators 355A and 355B.
Figure 8:
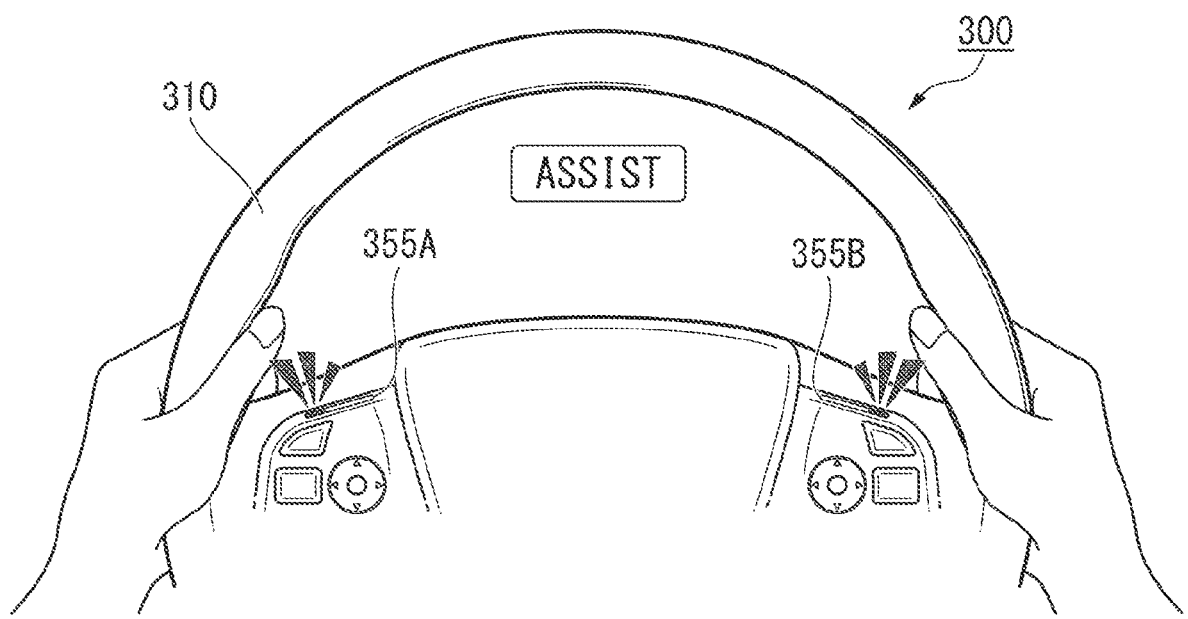
FIG. 8 is a view showing the lighting states of the indicators 355A and 355B.
Figure 9:
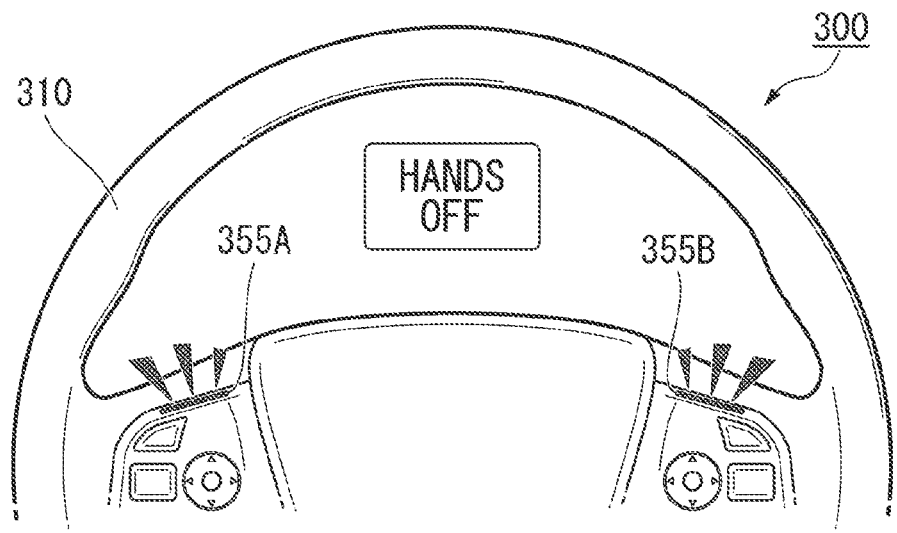
FIG. 9 is a view showing the lighting states of the indicators 355A and 355B.
Figure 10:
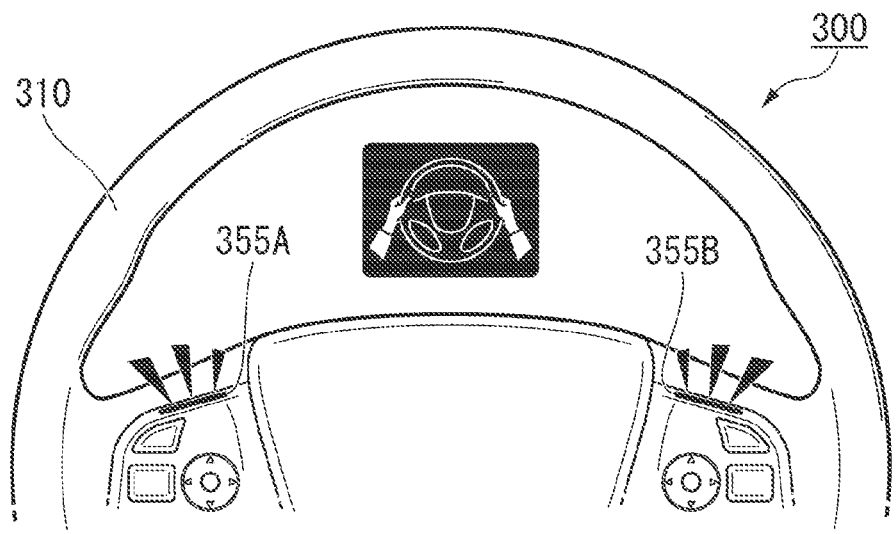
FIG. 10 is a view showing the lighting states of the indicators 355A and 355B.
Figure 11:
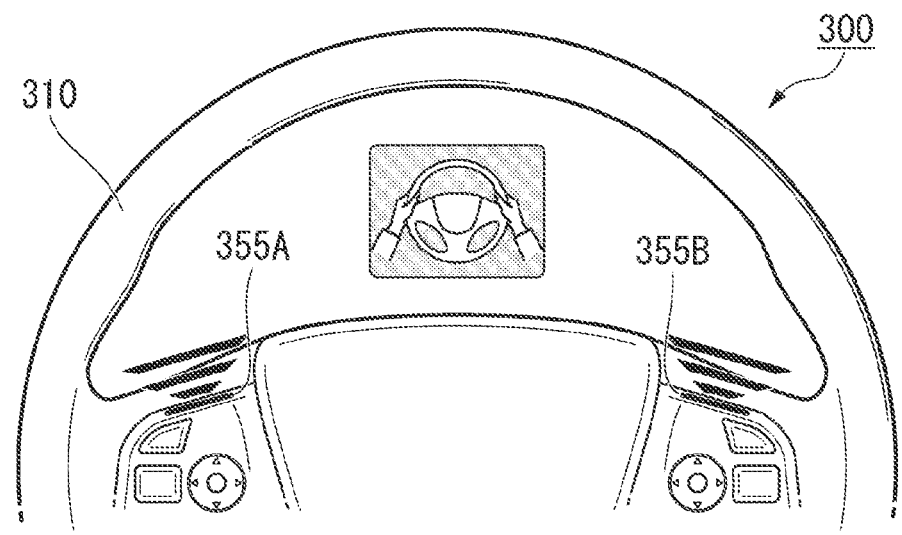
FIG. 11 is a view showing the lighting states of the indicators 355A and 355B.

FIG. 6 is a flowchart showing a flow of processes performed by the automated driving control unit 100. FIGS. 7 to 11 are views showing the lighting states of the indicators 355A and 355B and are front views of the front portion of the driver's seat. In FIG. 6, "indicator" is abbreviated as "IND."

As shown in FIG. 6, the first controller 120 determines whether or not automated driving can be started (step S100). When automated driving can be started (S100: YES), the first controller 120 starts driving assistance (an assist mode) requiring the occupant's steering operation (step S102). Subsequently, the HMI controller 150 causes the entirety of each of the indicators 355A and 355B to flicker in blue (step S104, see FIG. 7) and the process proceeds to step S106. "Flickering" as used in the present embodiment means alternating between on and off states while changing the brightness. When automated driving cannot be started (S100: NO), the first controller 120 starts the assist mode (step S136). Subsequently, the HMI controller 150 turns off the indicators 355A and 355B (step S138) and the process proceeds to step S140. When the first controller 120 has started the assist mode, the HMI controller 150 may also cause the instrument panel to display that the assist mode is being executed.

In step S106, the first controller 120 determines whether or not an assistance start switch has been operated by the occupant. When the assistance start switch has been operated (S106: YES), the process proceeds to step S108. When the assistance start switch has not been operated (S106: NO), the HMI controller 150 causes a part of each of the indicators 355A and 355B to be lit in blue (step S110, see FIG. 8) and the process proceeds to step S106 again.

In step S108, the HMI controller 150 determines whether or not the occupant is gripping the steering wheel 300. The gripping of the steering wheel 300 by the occupant is determined by the detection result of the touch sensor provided on the steering wheel 300 and the steering torque input to the steering wheel 300. The occupant may also grip the steering wheel 300 on the basis of either the detection result of the touch sensor provided on the steering wheel 300 or the steering torque input to the steering wheel 300.

When the occupant is gripping the steering wheel 300 (S108: YES), the process proceeds to step S110. When the occupant is not gripping the steering wheel 300 (S108: NO), the first controller 120 starts automated driving (step S112). Subsequently, the HMI controller 150 causes the entirety of each of the indicators 355A and 355B to be lit in blue (step S114, see FIG. 9) as a notification to the user about the start of automated driving and the process proceeds to step S116. That is, the HMI controller 150 changes the lighting state of each of the indicators 355A and 355B from a state in which the entirety thereof flickers in blue or a state in which a part thereof is lit in blue to a state in which the entirety is lit in blue. When the entirety of each of the indicators 355A and 355B is lit in blue, the HMI controller 150 may display that automated driving is being executed on the instrument panel. The display color on the instrument may be made to match the light emission color of each of the indicators 355A and 355B.

In step S116, the HMI controller 150 acquires information on the driving mode through the first controller 120 and determines whether or not the driving mode is to be changed from automated driving to manual driving. When there is no change in the driving mode from automated driving to manual driving (S116: NO), the process waits for a predetermined time (step S118) and proceeds to step S116 again.

When the driving mode is to be changed from automated driving to manual driving (S116: YES), the HMI controller 150 causes the entirety of each of the indicators 355A and 355B to be lit in amber as a handover request notification to the user (step S120, see FIG. 10) and then the process proceeds to step S122. When causing the entirety of each of the indicators 355A and 355B to be lit in amber, the HMI controller 150 may also cause the handover request notification to be displayed on the instrument panel.

In step S122, the HMI controller 150 determines whether or not the occupant is gripping the steering wheel 300. When the occupant is gripping the steering wheel 300 (S122: YES), manual driving can be started and therefore the HMI controller 150 turns off the indicators 355A and 355B (step S124) and the process ends. When the occupant is not gripping the steering wheel 300 (S122: NO), the process proceeds to step S126.

In step S126, the HMI controller 150 determines whether or not a first predetermined time has elapsed from the lighting of each of the indicators 355A and 355B in amber in step S120. When the first predetermined time has not elapsed from the lighting of each of the indicators 355A and 355B in amber (S126: NO), the process proceeds to step S122 again. When the first predetermined time has elapsed from the lighting of each of the indicators 355A and 355B in amber (S126: YES), the process proceeds to step S128.

If the determination of step S126 is YES, the occupant is not aware of the change in the light emission color of each of the indicators 355A and 355B (change from blue to amber), for example, because the occupant is looking away. In step S128, the HMI controller 150 causes the entirety of each of the indicators 355A and 355B to flicker in amber (see FIG. 11) and the process proceeds to step S130. When causing the entirety of each of the indicators 355A and 355B to flicker in amber, the HMI controller 150 may also cause a handover request notification to be displayed on the instrument panel.

In step S130, the HMI controller 150 determines whether or not the occupant is gripping the steering wheel 300. When the occupant is gripping the steering wheel 300 (S130: YES), manual driving can be started and therefore the process proceeds to step S124 to turn off the indicators 355A and 355B. Then, the process ends. When the occupant is not gripping the steering wheel 300 (S130: NO), the process proceeds to step S132.

In step S132, the HMI controller 150 determines whether or not a second predetermined time has elapsed from the flickering of each of the indicators 355A and 355B in amber in step S128. When the second predetermined time has not elapsed from the flickering of each of the indicators 355A and 355B in amber (S132: NO), the process proceeds to step S130 again.

When the second predetermined time has elapsed from the flickering of each of the indicators 355A and 355B in amber (S132: YES), the first controller 120 and the second controller 140 cause the own-vehicle M to stop at an emergency stop position (step S134) and then the process ends.

In step S136, the HMI controller 150 determines whether or not the occupant is gripping the steering wheel 300. When the occupant is gripping the steering wheel 300 (S136: YES), the process returns to step S100 again. When the occupant is not gripping the steering wheel 300 (S140: NO), the process proceeds to step S120 to urge the occupant to grip the steering wheel 300.

When the HMI controller 150 causes the indicators 355A and 355B to be lit or flicker, the navigation device 50 may make the display color of a trajectory displayed on the display device of the navigation HMI 52 match the light emission color of the indicators 355A and 355B. The HMI controller 150 may also control the brightness of each of the indicators 355A and 355B such that it differs between day and night. In addition, although the HMI controller 150 causes the indicators 355A and 355B to flicker in the above steps S104 and S128, the HMI controller 150 may also blink the indicators 355A and 355B. "Blinking" as used herein means alternating between an on state with constant brightness and an off state. The above step S128 may also be executed if an emergency situation requiring the occupant's steering operation occurs during the execution of automated driving.

As described above, in the present embodiment, the vehicle control device includes the steering wheel 300 having a plurality of spoke portions 320A and 320B that extend inward from the rim portion 310, the first and second indicators 355A and 355B that are disposed on the spoke portions 320A and 320B and can be lit, and the HMI controller 150 that controls the lighting state of each of the indicators 355A and 355B according to the state of driving assistance. According to this configuration, even when the occupant is gripping the rim portion 310, it is possible to allow the occupant to visually recognize the indicators 355A and 355B whose lighting states are controlled according to the state of driving assistance. Therefore, it is possible to provide a vehicle control device which can ensure the visibility of the indicators 355A and 355B disposed on the steering wheel 300.

In addition, the steering wheel 300 is provided at the occupant side of the instrument panel. Therefore, by arranging the indicators 355A and 355B on the steering wheel 300, the indicators 355A and 355B can be arranged such that they come into the occupant's view even when the occupant is looking away. Thus, it is possible to allow the occupant to visually recognize the state of driving assistance.

Further, the indicators 355A and 355B extend obliquely downward in a direction toward the radially outer side of the steering wheel 300. Therefore, even when the steering wheel 300 has rotated from the neutral state for manual driving, by identifying the positional relationship between the rotational axis line of the steering wheel 300 and both end portions of the indicators 355A and 355B, it is possible to easily determine where each of the upper portion and the lower portion of the rim portion 310 with the steering wheel 300 in the neutral state is positioned with respect to the rotational axis line of the steering wheel 300. Thus, it is possible to easily determine the rotation angle of the steering wheel 300 with respect to the neutral state, and thus when the occupant grips the steering wheel 300 from a state in which the occupant is not gripping the steering wheel 300, it is possible to allow the occupant to smoothly grip the steering wheel 300.

Furthermore, the pair of indicators 355A and 355B are disposed on the left and right sides with the rotational axis line of the steering wheel 300 positioned therebetween. Therefore, since the pair of indicators 355A and 355B are formed asymmetrically in the up-down direction with the steering wheel 300 in the neutral state for manual driving, even when the steering wheel 300 has rotated from the neutral state for manual driving, it is possible to easily determine the positions of the upper and lower portions of the steering wheel 300 in the neutral state. Thus, it is possible to easily determine the rotation angle of the steering wheel 300 with respect to the neutral state, and thus when the occupant grips the steering wheel 300 from a state in which the occupant is not gripping the steering wheel 300, it is possible to allow the occupant to smoothly grip the steering wheel 300.

In addition, the first inclined surface 321 on which the first indicator 355A is disposed and the second inclined surface 322 on which the second indicator 355B is disposed are inclined forward in a direction toward the radially outer side of the steering wheel 300. Therefore, as compared to when the inclined surfaces are not inclined in the forward-rearward direction, a shadow cast by an in-vehicle structure such as the rim portion 310 of the steering wheel 300 is more likely to be formed on the inclined surfaces 321 and 322. Thereby, it is possible to ensure the visibility of the lighting states of the first indicator 355A disposed on the first inclined surface 321 and the second indicator 355B disposed on the second inclined surface 322.

Further, the inclined surfaces 321 and 322 are formed such that they face the opposite sides in the lateral direction of the vehicle. Thus, for example, even when the sunlight is reflected to the occupant side on one of the inclined surfaces, the first inclined surface 321, such that the occupant cannot visually recognize the lighting state of the indicator 355A, the sunlight reflected on the other inclined surface, the second inclined surface 322, is not reflected to the occupant side, such that the occupant can visually recognize the lighting state of the indicator 355B. Accordingly, it is possible to ensure the visibility of the indicators 355A and 355B.

Furthermore, the indicators 355A and 355B are disposed at positions along the boundary line between the skin material 330 and the switch unit 350. Since a step is formed at the boundary between the skin material 330 and the switch unit 350, the indicators 355A and 355B can be disposed at portions shadowed by the step. Thus, it is possible to prevent external light from being directly incident on the indicators 355A and 355B and thus to ensure the visibility of the indicators 355A and 355B which are being lit.

In addition, the HMI controller 150 controls the light emission color or the light emission area of each of the indicators 355A and 355B according to the state of driving assistance. Therefore, by allowing the occupant to visually recognize a change in the light emission color or the light emission area of each of the indicators 355A and 355B, it is possible to notify the occupant of the state of driving assistance.

Further, when notifying the occupant of transition from automated driving to manual driving, the HMI controller 150 changes the light emission color of each of the indicators 355A and 355B from that before the notification. Therefore, by allowing the occupant to visually recognize a change in the light emission color of each of the indicators 355A and 355B, it is possible to notify the occupant of transition from automated driving to manual driving.

Furthermore, the HMI controller 150 changes the emission area of each of the indicators 355A and 355B when notifying the occupant of the start of automated driving. Therefore, by allowing the occupant to visually recognize a change in the emission area of each of the indicators 355A and 355B, it is possible to notify the occupant of the start of automated driving.

In the above embodiment, when the driving mode is to be changed from automated driving to manual driving, the HMI controller 150 turns off the indicators 355A and 355B upon determining that the occupant is gripping the steering wheel 300. However, the present invention is not limited to this.

Figure 12:
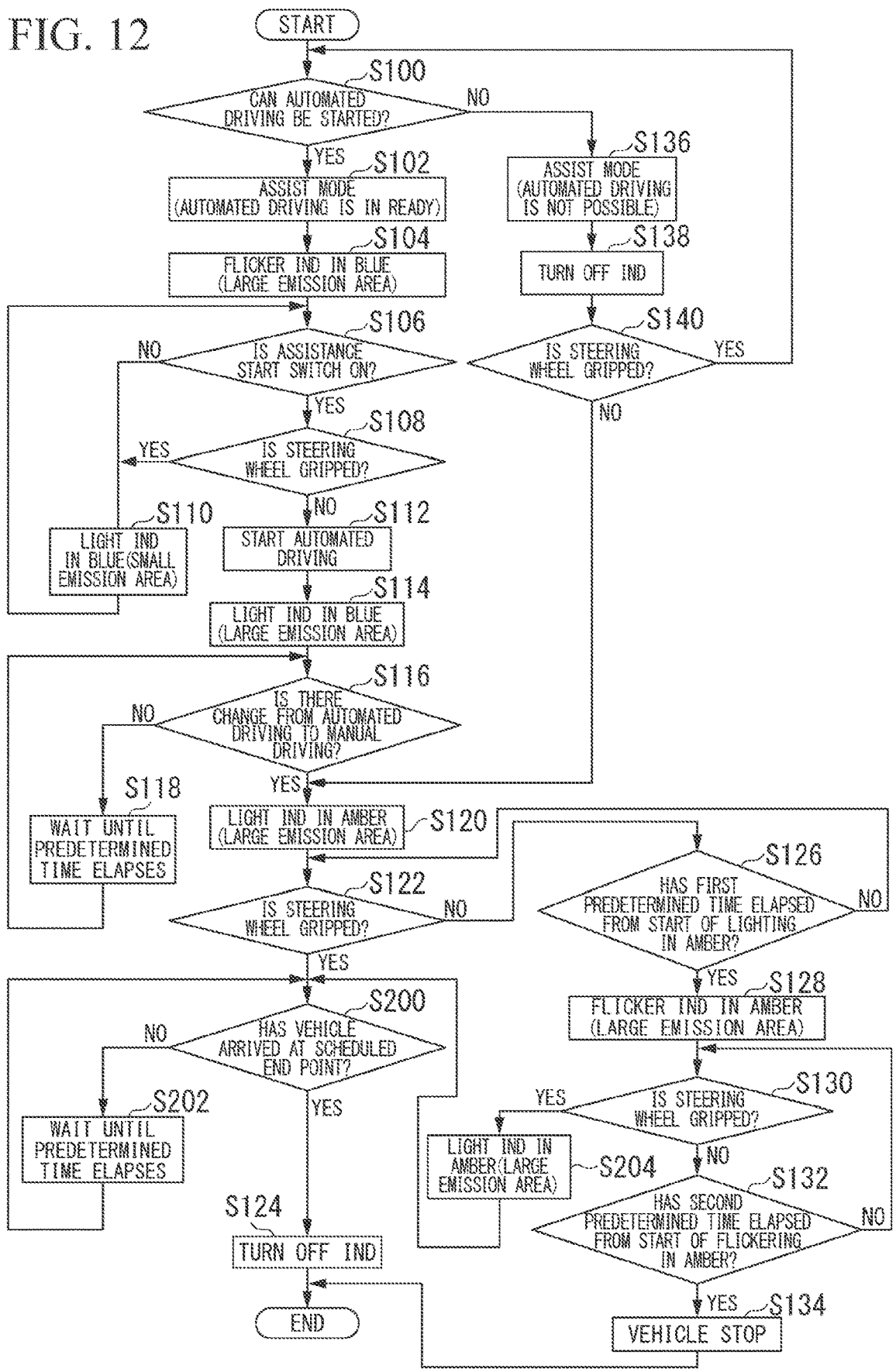
FIG. 12 is a flowchart showing a flow of processes performed by the automated driving control unit 100 according to a modification of the embodiment.

FIG. 12 is a flowchart showing a flow of processes performed by the automated driving control unit 100 according to a modification of the embodiment. The same reference signs are assigned to the same processes as those of the automated driving control unit 100 shown in FIG. 6 and detailed descriptions thereof will be omitted.

As shown in FIG. 12, in the modification of the embodiment, if it is determined in step S122 that the occupant is gripping the steering wheel 300 (S122: YES), the process proceeds to step S200. In step S200, the HMI controller 150 determines whether or not the own-vehicle M has arrived at a scheduled end point of the automated driving.

Upon determining that the own-vehicle M has arrived at the scheduled end point of automated driving (S200: YES), the HMI controller 150 proceeds to step S124 to turn off the indicators 355A and 355B and ends the process. Upon determining that the own-vehicle M has not arrived at the scheduled end point of the automated driving (S200: NO), the HMI controller 150 waits for a predetermined time (step S202) and proceeds to step S200 again.

Upon determining in step S130 that the occupant is gripping the steering wheel 300 (S130: YES), the HMI controller 150 causes the entirety of each of the indicators 355A and 355B to be lit in amber (step S204) and then proceeds to step S200.

As described above, if the occupant starts a steering operation (that is, if the occupant is gripping the steering wheel 300) when a transition from automated driving to manual driving is performed, the HMI controller 150 causes the indicators 355A and 355B to be lit until the scheduled end point of the automated driving is reached. Therefore, it is possible to allow the occupant to visually recognize that a transition from automated driving to manual driving is being performed. Here, even when the occupant is gripping the rim portion 310, it is possible to allow the occupant to visually recognize the indicators 355A and 355B since the indicators 355A and 355B are disposed on the spoke portions 320A and 320B.

It is to be noted that the present invention is not limited to the embodiment described above with reference to the drawings and various modifications are conceivable within the technical scope of the present invention.

For example, in the above embodiment, the first indicator 355A is disposed on the first spoke portion 320A and the second indicator 355B is disposed on the second spoke portion 320B, but the present invention is not limited thereto. One or a plurality of indicators may be disposed on the third spoke portion 320C. The first indicator 355A and the second indicator 355B may also be provided in connection with each other.

In the above embodiment, the indicators 355A and 355B are inclined downward in a direction from the radially inner side to the radially outer side, but the present invention is not limited thereto. Each indicator may be inclined upward in a direction from the radially inner side to the radially outer side. Further, one indicator may be inclined upward in a direction from the radially inner side to the radially outer side, and the other indicator may be inclined downward in a direction from the radially inner side to the radially outer side.

In the above embodiment, the indicators 355A and 355B are disposed on the inclined surfaces 321 and 322 which are inclined forward in a direction from the radially inner side to the radially outer side on the spoke portions 320A and 320B, but the present invention is not limited thereto. Each indicator may be disposed on an inclined surface which is inclined rearward in a direction from the radially inner side to the radially outer side on the spoke portions 320A and 320B.

In the above embodiment, the indicators 355A and 355B extend linearly, but the present invention is not limited thereto. Each indicator may extend curved or bent as viewed from the forward-rearward direction or the axial direction. Each indicator may also be formed by arranging a plurality of light sources that are lit in the shape of dots side by side.

In the above embodiment, each of the indicators 355A and 355B is capable of emitting light in two colors, blue and amber. However, the present invention is not limited to this and each of the indicators 355A and 355B may also be capable of emitting light in a color(s) other than blue and amber.

In the control of the lighting state of each of the indicators 355A and 355B by the automated driving control unit 100 in the above embodiment, the light emission color is changed in step S120 when the occupant is notified of a handover request, but the present invention is not limited to thereto. When the occupant is notified of a handover request, only the brightness or the emission area may be changed or two or more of the light emission color, the brightness, and the emission area may be changed.

Further, in the above embodiment, the HMI controller 150 changes the lighting state of each of the indicators 355A and 355B when notifying the occupant of the start of automated driving or when notifying the occupant of a handover request, but the present invention is not limited thereto. The HMI controller 150 may control the lighting state of each of the indicators 355A and 355B when a change in the state of driving assistance other than that described above is made. For example, the HMI controller 150 may control the lighting state of each of the indicators 355A and 355B when notifying the occupant of transition from a first mode to a second mode in which the engagement in vehicle operation is higher (the degree of automated driving is lower) than that in the first mode out of the modes of automated driving.

Besides, the constituent elements in the embodiment described above can be appropriately replaced with well-known constituent elements without deviating from the gist of the present invention.

INDUSTRIAL APPLICABILITY

According to the above vehicle control device, even when the occupant is gripping the rim portion, it is possible to allow the occupant to visually recognize the indicators whose lighting states are controlled according to the state of driving assistance. Therefore, it is possible to provide a vehicle control device which can ensure the visibility of the indicators disposed on the steering wheel.

REFERENCE SIGNS LIST

150 HMI controller (controller, vehicle control device)
300 Steering wheel (vehicle control device)

310 Rim portion
320A First spoke portion (spoke portion)
320B Second spoke portion (spoke portion)
321 First inclined surface (inclined surface)
322 Second inclined surface (inclined surface)
330 Skin material
350 Switch unit
351 Operation members
355A First indicator (indicator, vehicle control device)
355B Second indicator (indicator, vehicle control device)

What is claimed is:

1. A vehicle control device comprising:
a steering wheel comprising an annular rim portion and a spoke portion that extends inward from the rim portion;
a pair of indicators that is disposed on the spoke portion and is able to be lit; and
a controller configured to control a lighting state of the pair of indicators according to a state of driving assistance,
wherein
the state of driving assistance includes an automated driving mode,
each of the indicators of the pair of indicators extends obliquely either upward or downward in a direction from a radially inner side to a radially outer side of the steering wheel with the steering wheel in a neutral state,
an indicator of the pair of indicators is disposed on each of left and right sides of the steering wheel in a lateral direction of a vehicle with a rotational axis line of the steering wheel positioned therebetween with the steering wheel in the neutral state,
the indicators of the pair of indicators are disposed on left and right inclined surfaces of the steering wheel, which inclined surfaces are inclined either forward or rearward in a direction from a radially inner side to a radially outer side of the steering wheel on the spoke portion, and
the left and right inclined surfaces face opposite sides in the lateral direction of the vehicle.

2. The vehicle control device according to claim 1, wherein an indicator of the pair of indicators is disposed on each of left and right sides of the steering wheel in the lateral direction of the vehicle with a rotational axis line of the steering wheel positioned therebetween with the steering wheel in the neutral state for manual driving.

3. The vehicle control device according to claim 1, wherein the steering wheel comprises:
a switch unit having an operation member; and
a skin material disposed on a surface of the steering wheel with at least the operation member exposed,
wherein the indicators of the pair of indicators are disposed at a position along a boundary line between the skin material and the switch unit.

4. The vehicle control device according to claim 1, wherein the controller is configured to control at least one of the group consisting of a light emission color, a brightness, and a light emission area of an indicator of the pair of indicators according to the state of the driving assistance.

5. The vehicle control device according to 1, wherein the controller is configured to, when notifying an occupant of transition from the automated driving mode to manual driving, change at least one of the group consisting of a light emission color, a brightness, and a light emission area of the indicator from that before the notifying.

6. The vehicle control device according to claim 5, wherein the control unit is configured to, when the occupant starts a steering operation when a transition from the automated driving mode to manual driving is performed, cause an indicator of the pair of indicators to be lit until a scheduled end point of the automated driving mode is reached.

7. The vehicle control device according to claim 1, wherein the controller is configured to, when notifying an occupant of start of the automated driving mode, change at least one of the group consisting of a light emission color, a brightness, and a light emission area of an indicator of the pair of indicators.

* * * * *